J. B. LYTLE.
FENDER FOR GROUND TREATING IMPLEMENTS.
APPLICATION FILED MAY 13, 1920.
1,359,404.
Patented Nov. 16, 1920.
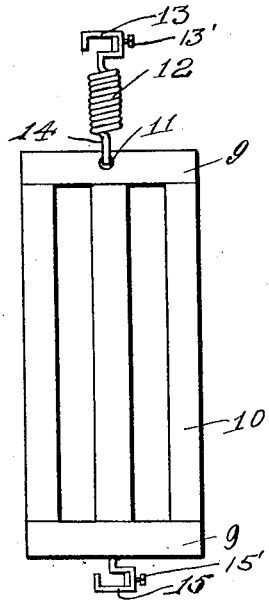
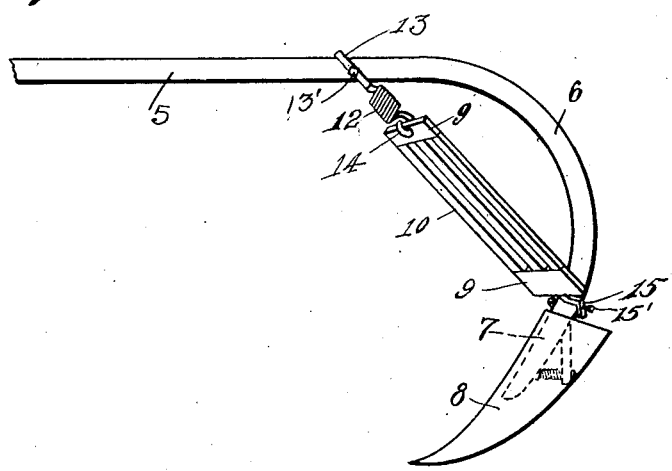
Inventor
J. B. Lytle.

UNITED STATES PATENT OFFICE.

JOHN B. LYTLE, OF NEW HOLLAND, OHIO.

FENDER FOR GROUND-TREATING IMPLEMENTS.

1,359,404.
Specification of Letters Patent.
Patented Nov. 16, 1920.

Application filed May 13, 1920. Serial No. 381,176.

*To all whom it may concern:*

Be it known that I, JOHN B. LYTLE, a citizen of the United States, residing at New Holland, in the county of Pickaway and State of Ohio, have invented a new and useful Fender for Ground-Treating Implements, of which the following is a specification.

The present invention relates to agricultural devices, and more particularly to plows especially designed for plowing corn or the like, and it is the primary object of the invention to provide an attachment which may be readily and easily applied to the usual plow construction now in use, for preventing the soil through which the plow is moving, from being thrown laterally to cover up the growing plants, which are under cultivation.

A further object of the invention is to provide a device of this character including a plurality of parallel bars having means for connecting the bars to the plow beam in a manner to permit the attachment to have a slight movement with relation to the plow beam in the event that the same meets with an obstruction.

With the foregoing and other objects in view which will appear as the description appears, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a plan view of the attachment.

Fig. 2 illustrates a side elevational view of a cultivator having the attachment connected thereto.

Referring to the drawing in detail, the reference character 5 designates the plow beam which is of the usual construction and includes the curved portion 6, terminating in a relatively straight portion 7, which provides means for connecting the plow 8, to the plow beam, the plow being of the usual shovel type employed in cultivating corn or the like.

The attachment, forming the subject matter of the present invention, comprises the end bars 9, which are connected by the parallel bars 10, the connection between the bars 9 and 10 being such as will prevent movement of the bars with relation to each other.

Formed substantially intermediate the ends of one of the bars 9, is an eye indicated at 11, which eye provides means for connecting the spring member 12 to the attachment, the spring member being shown as having a portion thereof indicated at 14, extending through the eye 11, while the outer or free end of the spring is formed into a spring clamping member indicated at 13, there being provided a set screw 13' for securing the clamping member to the plow beam in a manner to prevent movement thereof with relation to the plow beam, except through the spring member 12.

Having connection with the lower bar 9, is a hook member 15 which is secured to the bar 9 in a manner to prevent movement thereof with relation to the bar, so that the lower portion of the attachment will be secured against movement, thus insuring the attachment being maintained at a proper angle with relation to the plow beam to throw the earth being plowed or cultivated to a predetermined position.

It might be further stated that a set screw indicated at 15' is provided on the hook member 15 for securing the hook member 15 to the plow beam.

In the operation of the device, one end of the attachment has connection with the lower extremity of the curved portion of the plow beam, at a point in close proximity to the plow 8, the opposite end thereof has connection with the plow beam at a point between the outer or free end thereof, or the curved portion 6, so that the attachment, when in operation will be supported at an angle, as disclosed by Fig. 2 of the drawing.

From the foregoing, it is obvious that when the soil is thrown upwardly, by the movement of the shovel plow through the soil, the soil contacts with the attachment to cause the soil to be thrown to a position directly in the path of travel of the plow 8.

Having thus described the invention, what is claimed as new is:—

1. In combination with a plow and the curved portion of the plow beam thereof, an attachment comprising a plurality of parallel bars, said bars having the ends thereof connected, clamping members for securing the attachment to the plow beam at opposite ends of the curved portion, and means for connecting the attachment to the clamping members.

2. In combination with a plow and the curved portion of the plow beam thereof, an attachment including parallel bars, end bars connecting the parallel bars at their ends, a spring member having connection with one end of the attachment, a clamping member carried by the opposite end of the attachment, a clamping member carried by the spring member, said clamping members adapted to be clamped to the plow beam adjacent the curved portion thereof and in front of the plow for securing the attachment against movement with relation thereto.

In testimony that I claim the foregoing as my own, I have hereto affixed my signature in the presence of two witnesses.

JOHN B. LYTLE.

Witnesses:
McKINLEY BIRK,
B. A. TIMMONS.